United States Patent
Ackermann

(10) Patent No.: US 12,516,606 B2
(45) Date of Patent: Jan. 6, 2026

(54) PISTON-RING SEAL LEAKAGE TOLERANT HPC TIE-SHAFT

(71) Applicant: RTX Corporation, Farmington, CT (US)

(72) Inventor: William K. Ackermann, East Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/235,402

(22) Filed: Aug. 18, 2023

(65) Prior Publication Data

US 2025/0059892 A1 Feb. 20, 2025

(51) Int. Cl.
*F01D 5/08* (2006.01)

(52) U.S. Cl.
CPC ........ *F01D 5/08* (2013.01); *F05D 2220/3219* (2013.01); *F05D 2300/514* (2013.01); *F05D 2300/611* (2013.01)

(58) Field of Classification Search
CPC .............. F01D 5/08; F05D 2220/3219; F05D 2300/514; F05D 2300/611
See application file for complete search history.

(56) References Cited

U.S. PATENT DOCUMENTS

| | | | |
|---|---|---|---|
| 3,388,913 A | 6/1968 | Tracy | |
| 9,897,217 B2 | 2/2018 | Greene | |
| 2006/0222884 A1* | 10/2006 | Nagaraj | C23C 18/1254 428/688 |
| 2013/0004301 A1* | 1/2013 | Strock | C23C 28/3215 415/174.4 |
| 2013/0280028 A1* | 10/2013 | Benjamin | F02C 7/12 415/177 |
| 2018/0291815 A1 | 10/2018 | Munson et al. | |
| 2019/0153945 A1 | 5/2019 | Balamurugan et al. | |
| 2019/0233929 A1* | 8/2019 | Torigoe | C23C 4/134 |
| 2020/0248555 A1* | 8/2020 | Armstrong | F01D 5/026 |
| 2020/0340369 A1 | 10/2020 | Benjamin | |
| 2023/0160315 A1* | 5/2023 | Lawliss | F04D 29/083 415/230 |

FOREIGN PATENT DOCUMENTS

EP 3611348 A1 2/2020

OTHER PUBLICATIONS

Rogerio S Lima, Porous APS YSZ TBC Manufactured at High Powder Feed Rate (100 g/min) and Deposition Efficiency (70%): Microstructure, Bond Strength and Thermal Gradients, Sep. 6, 2021, J Therm Spray Tech, 31, 396-414 (Year: 2021).*
Extended European Search Report for counterpart EP Application No. 24193959 dated Dec. 12, 2024.

* cited by examiner

*Primary Examiner* — Andrew J Marien
(74) *Attorney, Agent, or Firm* — Bachman & LaPointe, P.C.

(57) ABSTRACT

A tie-shaft with thermal barrier coating system including a tie-shaft including an inside diameter and an outside diameter opposite the inside diameter, an exterior surface proximate the outside diameter; a piston-ring seal in operative communication with the tie-shaft proximate the outside diameter; and the thermal coating system disposed on the exterior surface of the tie-shaft proximate the piston-ring seal.

19 Claims, 7 Drawing Sheets

PISTON-RING SEAL LEAKAGE TOLERANT HPC TIE-SHAFT

BACKGROUND

The present disclosure is directed to a high pressure compressor tie-shaft including a thermal barrier coating in the region proximate the piston-ring seal.

In order to achieve high cycle efficiencies, modern gas turbine engines run extremely hot flow path temperatures, even in the compressors. As a result high pressure compressor (HPC) inner diameter (ID) bleed temperatures can vary widely depending on from which stage they are sourced.

The existing gas turbine engine architecture currently utilizes a piston-ring seal at various rotating interface boundaries. The piston-ring seal design provides for secondary air flow sealing in locations such as the high pressure compressor bore cavity. These seals are currently experiencing wear in the field.

With an engine in a bowed-rotor condition, the top of the low-shaft gets hotter than the bottom because of latent engine-off heat transfer. The rotor then bows, creating rotor imbalance, and this results in the severe vibrations and excessive seal rub out that occurs when the engine is started. The mechanism for piston-ring-seal-induced rotor vibration is similar and confined to a more local region.

In the case of piston-ring-seal leakage, non-uniform localized hot streaks around the circumference generate non-uniform thermal regions immediately downstream of the seal that cause the tie-shaft to distort in a non-symmetric way, which then results in rotor imbalance and ultimately shaft/fan/low rotor/high rotor vibration.

What is needed is a thermal coating system that protects the high-spool tie-shaft from the localized piston-ring-seal leakage thermal energy.

SUMMARY

In accordance with the present disclosure, there is provided a tie-shaft with thermal barrier coating system comprising a tie-shaft including an inside diameter and an outside diameter opposite the inside diameter, an exterior surface proximate the outside diameter; a piston-ring seal in operative communication with the tie-shaft proximate the outside diameter; and the thermal coating system disposed on the exterior surface of the tie-shaft proximate the piston-ring seal.

A further embodiment of any of the foregoing embodiments may additionally and/or alternatively include the thermal barrier coating system is disposed on the tie-shaft forward of the piston-ring-seal along a forward region of the tie-shaft.

A further embodiment of any of the foregoing embodiments may additionally and/or alternatively include the thermal barrier coating system is disposed on the tie-shaft aft of the piston-ring seal along an aft region of the tie-shaft.

A further embodiment of any of the foregoing embodiments may additionally and/or alternatively include the thermal barrier coating system comprises a bond coat disposed on the exterior surface; and a thermal barrier coating disposed on the bond coat.

A further embodiment of any of the foregoing embodiments may additionally and/or alternatively include the thermal barrier coating comprises a porous coating with porosities ranging from 5% by volume to 70% by volume.

A further embodiment of any of the foregoing embodiments may additionally and/or alternatively include the thermal barrier coating comprises a thickness ranging from about 5 mils to about 30 mils.

A further embodiment of any of the foregoing embodiments may additionally and/or alternatively include the tie-shaft comprises a high pressure compressor high-spool tie-shaft.

In accordance with the present disclosure, there is provided a high-spool tie-shaft with thermal barrier coating system proximate a gas turbine engine high pressure compressor bore cavity comprising the high-spool tie-shaft including an inside diameter and an outside diameter opposite the inside diameter, an exterior surface proximate the outside diameter; a piston-ring seal in operative communication with the high-spool tie-shaft proximate the outside diameter, the piston-ring seal located between a front bore cavity portion and a rear bore cavity portion of the high pressure compressor bore cavity; and the thermal barrier coating system disposed on the exterior surface of the high-spool tie-shaft proximate the piston-ring seal.

A further embodiment of any of the foregoing embodiments may additionally and/or alternatively include the thermal barrier coating system is disposed on the high-spool tie-shaft aft of the piston-ring seal along an aft region of the high-spool tie-shaft, the aft region being located proximate the rear bore cavity portion of the high pressure compressor bore cavity.

A further embodiment of any of the foregoing embodiments may additionally and/or alternatively include the thermal barrier coating system is disposed on the high-spool tie-shaft forward of the piston-ring-seal along a forward region of the high-spool tie-shaft, the forward region being located proximate to front bore cavity portion of the high pressure compressor bore cavity.

A further embodiment of any of the foregoing embodiments may additionally and/or alternatively include the thermal barrier coating system comprises a bond coat disposed on the exterior surface; and a thermal barrier coating disposed on the bond coat.

A further embodiment of any of the foregoing embodiments may additionally and/or alternatively include the thermal barrier coating comprises a porous coating with porosities ranging from 5% by volume to 70% by volume.

A further embodiment of any of the foregoing embodiments may additionally and/or alternatively include the thermal barrier coating comprises a thickness ranging from about 5 mils to about 30 mils.

In accordance with the present disclosure, there is provided a process for preventing high-spool tie-shaft distortion created by piston-seal ring leakage thermal energy within a gas turbine engine high pressure compressor bore cavity comprising the high-spool tie-shaft including an inside diameter and an outside diameter opposite the inside diameter, an exterior surface proximate the outside diameter; a piston-ring seal in operative communication with the high-spool tie-shaft proximate the outside diameter, the piston-ring seal located between a front bore cavity portion and a rear bore cavity portion of the high pressure compressor bore cavity; and disposing a thermal barrier coating system on the exterior surface of the high-spool tie-shaft proximate the piston-ring seal.

A further embodiment of any of the foregoing embodiments may additionally and/or alternatively include the process further comprising disposing the thermal barrier coating system on the high-spool tie-shaft forward of the piston-ring-seal along a forward region of the high-spool tie-shaft, the forward region being located proximate to front bore cavity portion of the high pressure compressor bore cavity.

A further embodiment of any of the foregoing embodiments may additionally and/or alternatively include the process further comprising disposing the thermal barrier coating system on the high-spool tie-shaft aft of the piston-ring seal along an aft region of the high-spool tie-shaft, the aft region being located proximate the rear bore cavity portion of the high pressure compressor bore cavity.

A further embodiment of any of the foregoing embodiments may additionally and/or alternatively include the thermal barrier coating system comprises a bond coat disposed on the exterior surface; and a thermal barrier coating disposed on the bond coat.

A further embodiment of any of the foregoing embodiments may additionally and/or alternatively include the thermal barrier coating comprises a porous coating with porosities ranging from 5% by volume to 70% by volume.

A further embodiment of any of the foregoing embodiments may additionally and/or alternatively include the thermal barrier coating comprises a thickness ranging from about 5 mils to about 30 mils.

A further embodiment of any of the foregoing embodiments may additionally and/or alternatively include the process further comprising preventing non-uniform thermal regions in the high-spool tie-shaft downstream of the piston-ring seal from leakage induced non-uniform localized hot streaks around the high-spool tie-shaft.

Other details of the thermal coating system for the high-spool tie-shaft are set forth in the following detailed description and the accompanying drawings wherein like reference numerals depict like elements.

DETAILED DESCRIPTION

Figure 1:
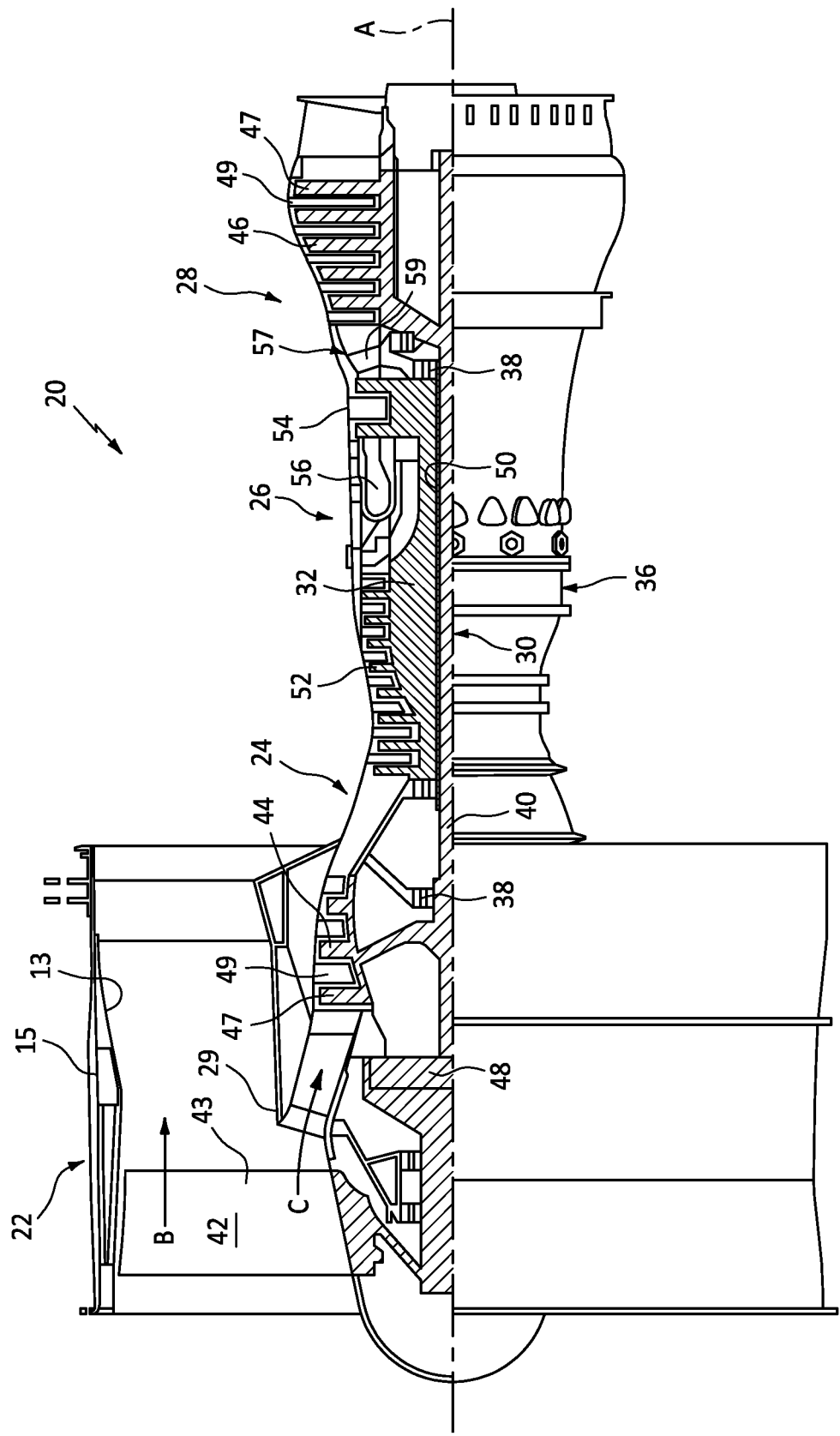
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(Tram\ °R)/(518.7°R)]^{0.5}$. The "low corrected fan tip speed" can be less than or equal to 1150.0 ft/second (350.5 meters/second), and greater than or equal to 1000.0 ft/second (304.8 meters/second).

Figure 2:
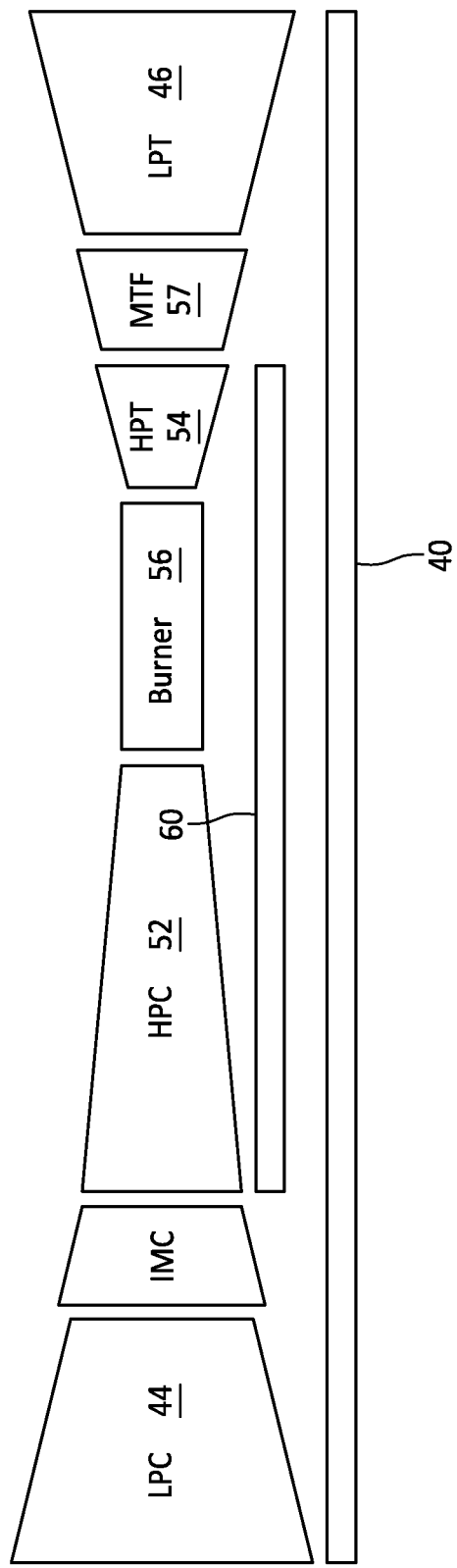
FIG. 2 is a cross section schematic representation of an exemplary high-spool tie-shaft in an engine.
Figure 3:
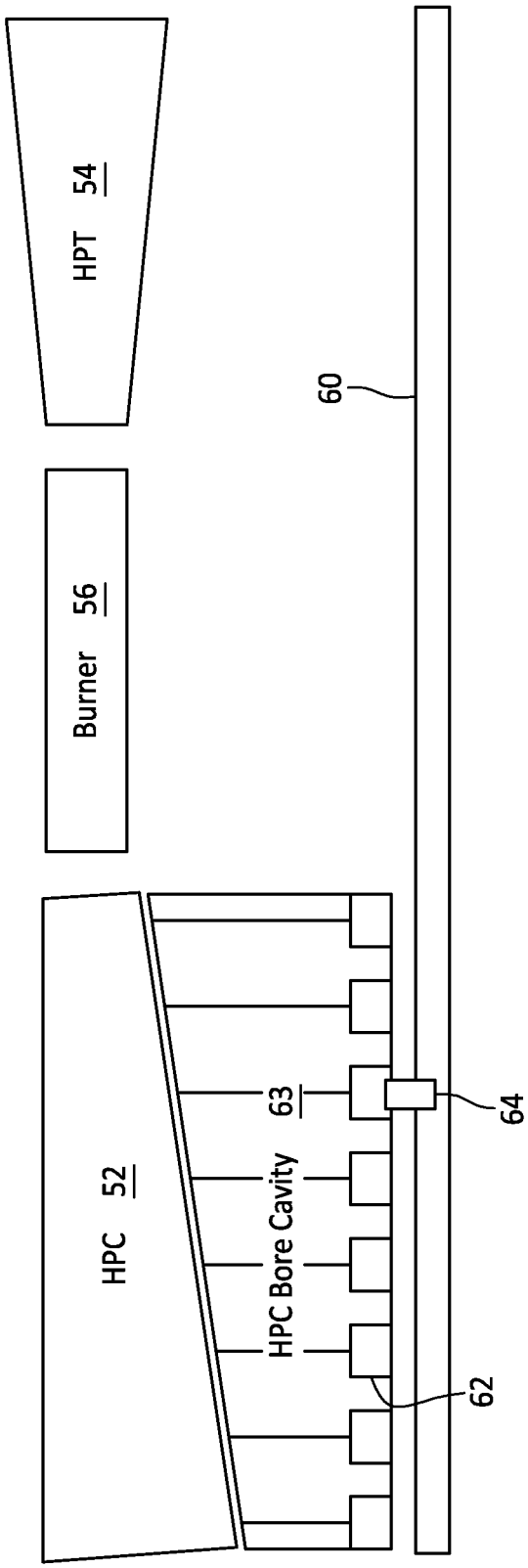
FIG. 3 is a cross section schematic representation of an exemplary high-spool tie-shaft in an engine with an exemplary piston-ring bore seal on the tie-shaft.
Figure 5:
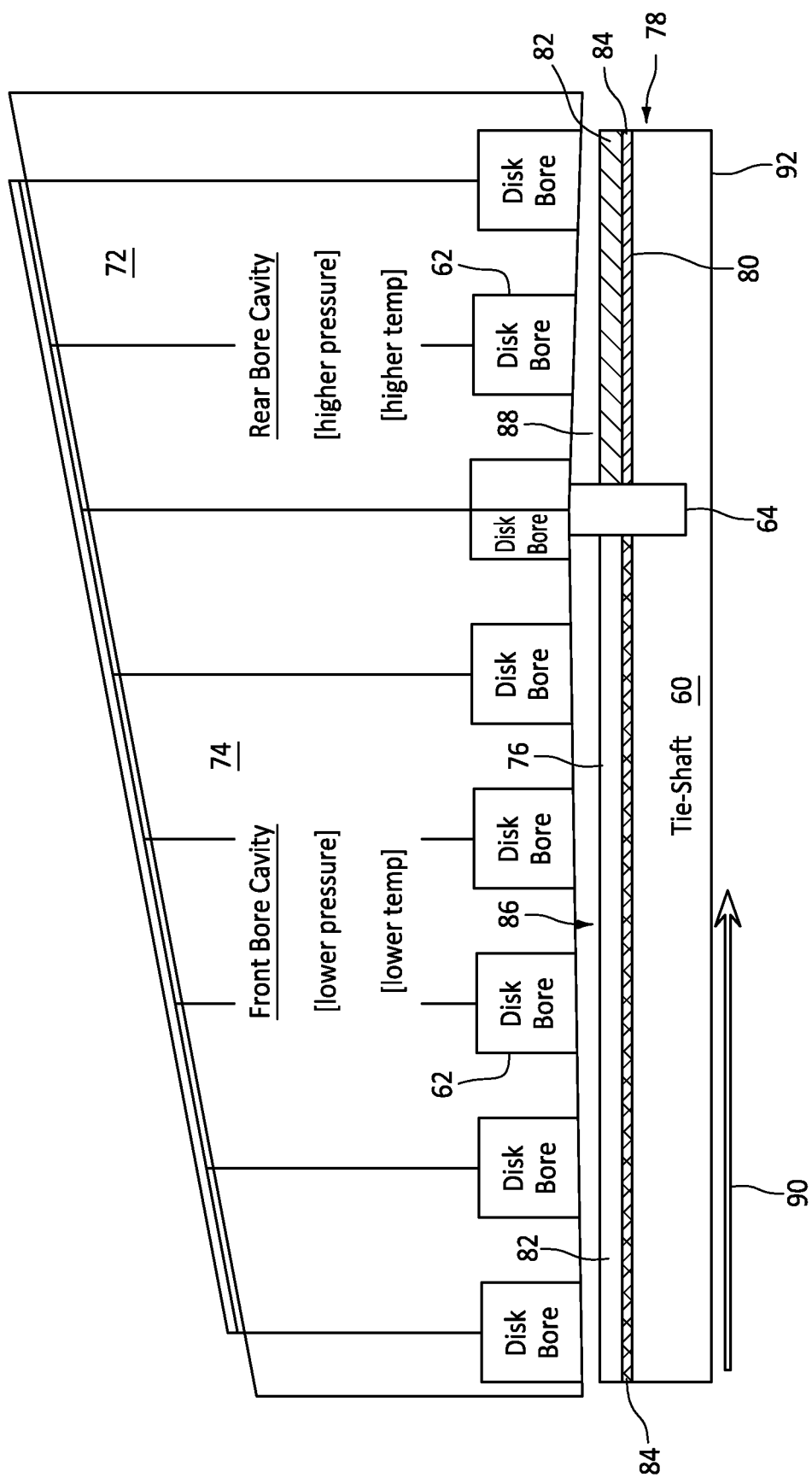
FIG. 5 is a blow-up view schematic representation of an exemplary high-spool tie-shaft in an engine with an exemplary piston-ring bore seal on the tie-shaft having an insulating coating.

Referring also to FIG. 2, through FIG. 5, a schematic of a high-spool tie-shaft 60 in the engine 20. For a generic engine 20 configuration of current commercial engine architecture, two compressor cooling air bleeds are typically used to cool/ventilate high pressure compressor disk/bores 62 in the high pressure compressor bore cavity 63. To optimize material selection and compressor blade-tip clearances, the front stages are generally cooled by a front HPC ID cooling air bleed while the rear stages are generally cooled by a rear HPC ID cooling air bleed. As expected, this results in a mid-HPC interface boundary (lower-pressure/lower-temperature bleed air in the forward section and higher-pressure/higher-temperature bleed air in the rearward section) that requires a rotating seal 64 to keep the two bleed flows isolated. The rotating seal 64 is a piston-ring seal 64 at this aforementioned rotating interface boundary.

The piston-ring seal 64 can provide sealing because there is no differential circumferential motion due to the presence of the high-spool tie-shaft 60.

Figure 4:
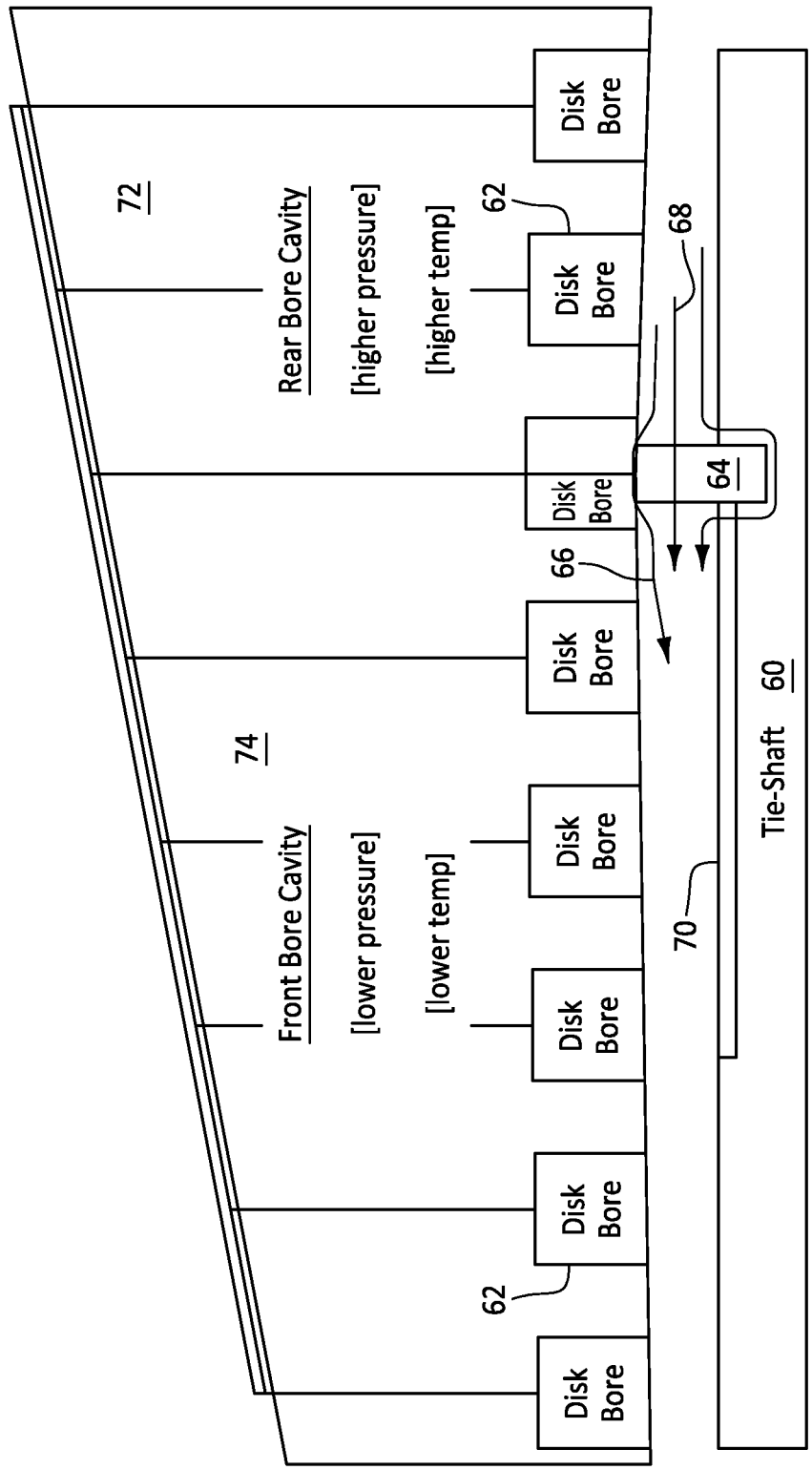
FIG. 4 is a blow-up view schematic representation of an exemplary high-spool tie-shaft in an engine with an exemplary piston-ring bore seal on the tie-shaft.

As discussed above and shown in FIG. 4, it is possible to have leakage 66 past the piston-ring-seal 64. The hot gases 68 that leak past the piston-ring-seal 64 heat the tie-shaft 60 proximate the piston-ring-seal 64. The thermal energy that is transferred to the tie-shaft 60 creates non-uniform localized hot streaks around the circumference of the tie-shaft 60. The leakage 66 can generate non-uniform thermal regions 70 immediately downstream of the piston-ring-seal 64 that cause the tie-shaft 60 to distort in a non-symmetric way.

A rear bore cavity portion 72 of the high pressure compressor bore cavity 63 experiences higher pressure and higher temperature relative to a front bore cavity portion 74 which is at a relatively lower pressure and temperature. This difference can drive the leakage 66 from the rear bore cavity portion 72 past the piston-ring-seal 64 into the front bore cavity portion 74. The rear bore cavity portion 72 is aft of the piston-ring seal 64 relative to the tie-shaft 60. The front bore cavity portion 74 is forward of the piston-ring seal 64 relative to the tie-shaft 60.

Figure 6:
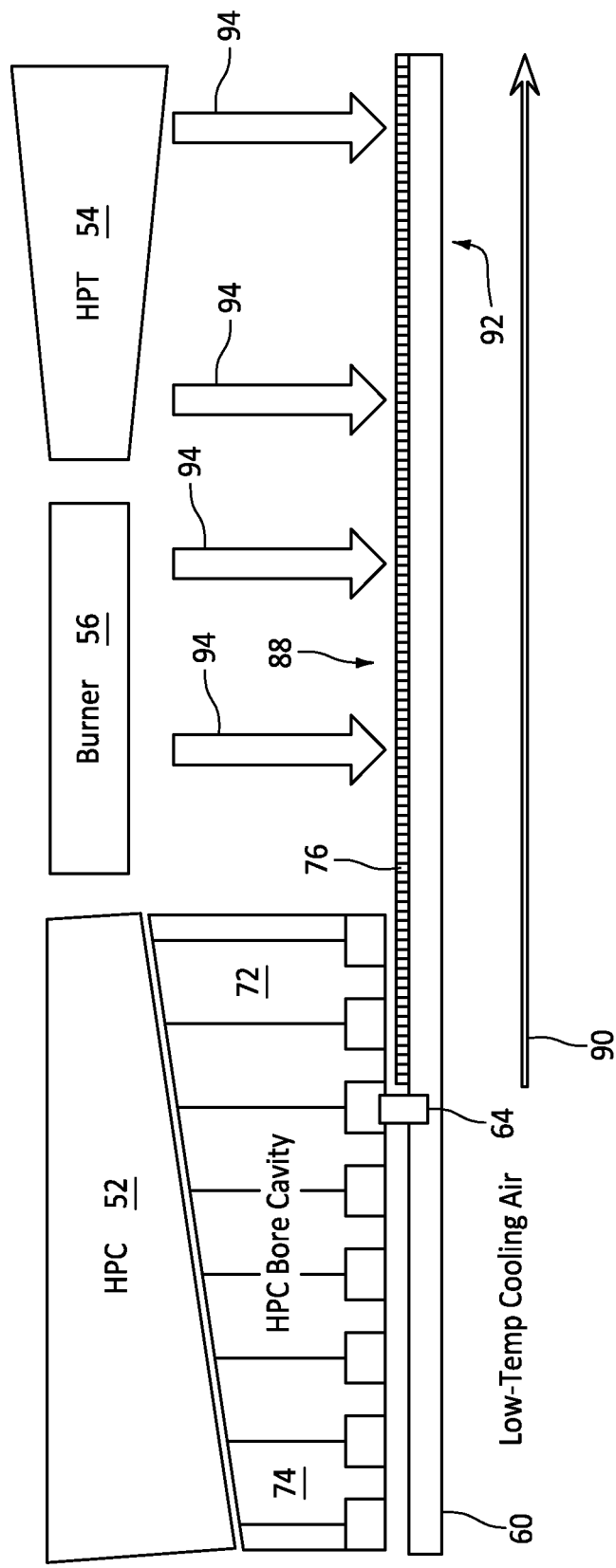
FIG. 6 is a blow-up view schematic representation of an exemplary high-spool tie-shaft in an engine with an exemplary piston-ring bore seal on the tie-shaft having an insulating coating.
Figure 7:
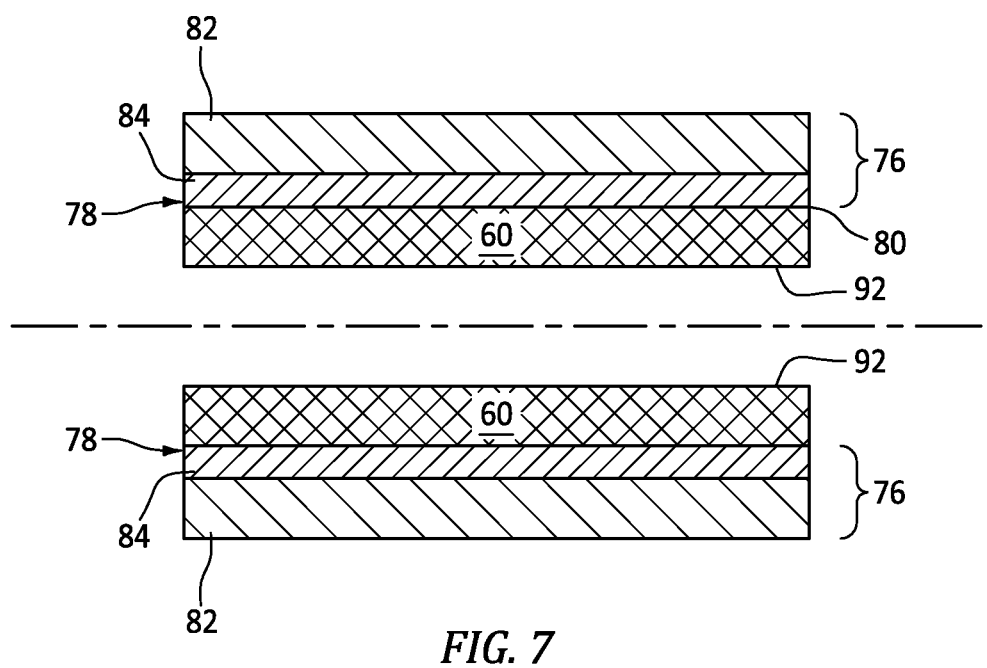
FIG. 7 is a cross section schematic representation of an exemplary high-spool tie-shaft having an insulating system coating.

Referring also to FIG. 5 to FIG. 7, a thermal coating system 76 can be disposed on an exterior surface 78 of the outside diameter 80 of the tie-shaft 60.

In an exemplary embodiment, the thermal coating system 76 can include a thermal barrier coating (TBC) 82 disposed on a bond coat 84. The bond coat 84 can be disposed on the exterior surface 78 of the tie-shaft 60. The thermal barrier coating 82 can include a high-porosity coating with a thickness ranging from about 5 mils to about 30 mils.

Referring also to FIG. 6, the thermal coating system 76 can be applied to the tie-shaft 60 along a forward region 86 proximate and forward of the piston-ring-seal 64. In another exemplary embodiment, the thermal coating system 76 can be disposed to the tie-shaft 60 along an aft region 88 aft of the piston-ring-bore-seal 64 as doing so should reduce metal temperatures in those regions due to the much cooler airflow 90 that scrubs the tie-shaft 60 inside diameter (ID) surface 92. Thermal energy 94 transfers to the tie-shaft 60 in the aft region 88.

In an exemplary embodiment, the thermal barrier coating 82 can benefit from being of the pre-cracked columnar variety, while the bond coat 84 can benefit from being of the more ductile variety to arrest internal TBC cracks from entering the metallic substrate of the tie-shaft 60.

The material selected for the bond coat 84 (if used), and thermal barrier coating 82 are not necessarily limited to any particular kind. The bond coat 84 may include any suitable type of bonding material for attaching the thermal barrier coating 82 to the substrate of the tie-shaft 60. In some embodiments, the bond coat 84 includes a nickel alloy, platinum, gold, silver, or MCrAlY where the M includes at least one of nickel, cobalt, iron, or combination thereof, Cr is chromium, Al is aluminum and Y is yttrium. The bond coat 84 may be approximately 8-12 mills thick, but may be thicker or thinner depending, for example, on the type of material selected and requirements of a particular application.

The thermal barrier coating 82 can comprise a matrix of materials. The thermal barrier coating 82 matrix of materials can be formed from ultra-high inorganic materials held together with binder (>75% inorganic content in as formed coating). The thermal barrier coating 82 may be any type of ceramic material suited for providing a desired heat resistance in the tie-shaft 60. As an example, the thermal barrier coating 82 may be a coating, such as yttria stabilized zirconia, hafnia, and/or gadolinia, gadolinia zirconate, molybdate, alumina, or combinations thereof. The thermal barrier coating 82 may also include porosity. While various porosities may be selected, typical porosities in include 5 to 70% by volume. In an exemplary embodiment the TBC topcoat 82 can include a 10 to 40 v % porosity. In another exemplary embodiment the thermal barrier coating 82 can have a porosity of 15 to 25 v %.

A technical advantage of the disclosed thermal coating system for the high-spool tie-shaft includes improved compressor/turbine blade-tip clearances, since N2-driven high-shaft vibration tends to rub out blade-tip clearances throughout the machine.

Another technical advantage of the disclosed thermal coating system for the high-spool tie-shaft includes improved performance retention, since compressor/turbine blade-tip seal rubs are known to result in deteriorated engine performance.

Another technical advantage of the disclosed thermal coating system for the high-spool tie-shaft includes an improved engine operability, since compressor blade-tip seal rubs are also known to reduce compressor surge margin.

Another technical advantage of the disclosed thermal coating system for the high-spool tie-shaft includes improved engine durability, since reduced performance levels increase cycle temps because the required thrust is constant for a given application.

Another technical advantage of the disclosed thermal coating system for the high-spool tie-shaft includes a solution that does not add any significant amount of engine weight.

Another technical advantage of the disclosed thermal coating system for the high-spool tie-shaft includes lower aft tie-shaft temperatures that can enable use of lower cost materials.

Another technical advantage of the disclosed thermal coating system for the high-spool tie-shaft includes the use of a thermal barrier coating with columnar "pre-cracked" structure geometrically segmented abradable ceramic (GSAC) coatings along with a suitable ductile bond coat that can overcome the oft-used paradigm that coatings cannot be used on stressed parts because their inherent porosity will drive cracks into the base material.

There has been provided a thermal coating system for the high-spool tie-shaft. While the thermal coating system for the high-spool tie-shaft has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A tie-shaft with a thermal barrier coating system comprising:
    the tie-shaft including an inside diameter and an outside diameter opposite the inside diameter, an exterior surface proximate the outside diameter;
    a piston-ring seal in operative communication with the tie-shaft proximate the outside diameter; and
    the thermal barrier coating system disposed on the exterior surface of the tie-shaft proximate the piston-ring seal.

2. The tie-shaft with the thermal barrier coating system according to claim 1, wherein the thermal barrier coating system is disposed on the tie-shaft forward of the piston-ring-seal along a forward region of the tie-shaft.

3. The tie-shaft with the thermal barrier coating system according to claim 1, wherein the thermal barrier coating system is disposed on the tie-shaft aft of the piston-ring seal along an aft region of the tie-shaft.

4. The tie-shaft with the thermal barrier coating system according to claim 1, wherein the thermal barrier coating system comprises:
    a bond coat disposed on the exterior surface; and
    a thermal barrier coating disposed on the bond coat.

5. The tie-shaft with the thermal barrier coating system according to claim 4, wherein the thermal barrier coating comprises porosities ranging from 5% by volume to 70% by volume.

6. The tie-shaft with the thermal barrier coating system according to claim 4, wherein the thermal barrier coating comprises a thickness ranging from 5 mils to 30 mils.

7. The tie-shaft with the system according to claim 1, thermal barrier coating wherein the tie-shaft comprises a high pressure compressor high-spool tie-shaft.

8. A high-spool tie-shaft with a thermal barrier coating system proximate a gas turbine engine high pressure compressor bore cavity comprising:
    the high-spool tie-shaft including an inside diameter and an outside diameter opposite the inside diameter, an exterior surface proximate the outside diameter;
    a piston-ring seal in operative communication with the high-spool tie-shaft proximate the outside diameter, the piston-ring seal located between a front bore cavity portion and a rear bore cavity portion of the high pressure compressor bore cavity; and
    the thermal barrier coating system disposed on the exterior surface of the high-spool tie-shaft proximate the piston-ring seal.

9. The high-spool tie-shaft with the thermal barrier coating system proximate the gas turbine engine high pressure compressor bore cavity according to claim 8, wherein the thermal barrier coating system is disposed on the high-spool tie-shaft aft of the piston-ring seal along an aft region of the high-spool tie-shaft, the aft region being located proximate the rear bore cavity portion of the high pressure compressor bore cavity.

10. The high-spool tie-shaft with the thermal barrier coating system proximate the gas turbine engine high pressure compressor bore cavity according to claim 8, wherein the thermal barrier coating system is disposed on the high-spool tie-shaft forward of the piston-ring-seal along a forward region of the high-spool tie-shaft, the forward region being located proximate to the front bore cavity portion of the high pressure compressor bore cavity.

11. The high-spool tie-shaft with the thermal barrier coating system proximate a gas turbine engine high pressure compressor bore cavity according to claim 8, wherein the thermal barrier coating system comprises:

a bond coat disposed on the exterior surface; and a thermal barrier coating disposed on the bond coat.

12. The high-spool tie-shaft with the thermal barrier coating system proximate a gas turbine engine high pressure compressor bore cavity according to claim 11, wherein the thermal barrier coating comprises porosities ranging from 5% by volume to 70% by volume.

13. The high-spool tie-shaft with the thermal barrier coating system proximate a gas turbine engine high pressure compressor bore cavity according to claim 11, wherein the thermal barrier coating comprises a thickness ranging from 5 mils to 30 mils.

14. A process for preventing high-spool tie-shaft distortion created by piston-seal ring leakage thermal energy within a gas turbine engine high pressure compressor bore cavity comprising:

a high-spool tie-shaft including an inside diameter and an outside diameter opposite the inside diameter, an exterior surface proximate the outside diameter;

a piston-ring seal in operative communication with the high-spool tie-shaft proximate the outside diameter, the piston-ring seal located between a front bore cavity portion and a rear bore cavity portion of the high pressure compressor bore cavity;

disposing a thermal barrier coating system on the exterior surface of the high-spool tie-shaft proximate the piston-ring seal and preventing non-uniform thermal regions in the high-spool tie-shaft downstream of the piston-ring seal from localized hot streaks around leakage induced non-uniform the high-spool tie-shaft.

15. The process of claim 14, further comprising:

disposing the thermal barrier coating system on the high-spool tie-shaft forward of the piston-ring-seal along a forward region of the high-spool tie-shaft, the forward region being located proximate to the front bore cavity portion of the high pressure compressor bore cavity.

16. The process of claim 14, further comprising:

disposing the thermal barrier coating system on the high-spool tie-shaft aft of the piston-ring seal along an aft region of the high-spool tie-shaft, the aft region being located proximate the rear bore cavity portion of the high pressure compressor bore cavity.

17. The process of claim 14, wherein the thermal barrier coating system comprises:

a bond coat disposed on the exterior surface; and a thermal barrier coating disposed on the bond coat.

18. The process of claim 14, wherein the thermal barrier coating comprises porosities ranging from 5% by volume to 70% by volume.

19. The process of claim 14, wherein the thermal barrier coating comprises a thickness ranging from 5 mils to 30 mils.

* * * * *